United States Patent
Donderici et al.

(10) Patent No.: US 10,711,602 B2
(45) Date of Patent: Jul. 14, 2020

(54) ELECTROMAGNETIC MONITORING WITH FORMATION-MATCHED RESONANT INDUCTION SENSORS

(71) Applicant: HALLIBURTON ENERGY SERVICES, INC., Houston, TX (US)

(72) Inventors: Burkay Donderici, Houston, TX (US); Luis E. San Martin, Houston, TX (US); Tasneem A. Mandviwala, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 430 days.

(21) Appl. No.: 15/500,879

(22) PCT Filed: Jul. 22, 2015

(86) PCT No.: PCT/US2015/041580
§ 371 (c)(1),
(2) Date: Jan. 31, 2017

(87) PCT Pub. No.: WO2017/014773
PCT Pub. Date: Jan. 26, 2017

(65) Prior Publication Data
US 2017/0218752 A1 Aug. 3, 2017

(51) Int. Cl.
*E21B 49/00* (2006.01)
*E21B 47/113* (2012.01)
(Continued)

(52) U.S. Cl.
CPC ............ *E21B 49/00* (2013.01); *E21B 47/113* (2020.05); *E21B 47/135* (2020.05); *G01V 3/28* (2013.01)

(58) Field of Classification Search
CPC .. E21B 1/00; E21B 15/00; G01N 1/00; G01N 2201/00
See application file for complete search history.

(56) References Cited

U.S. PATENT DOCUMENTS

| 4,360,272 A | 11/1982 | Schmadel et al. |
| 4,739,325 A | 4/1988 | MacLeod |

(Continued)

FOREIGN PATENT DOCUMENTS

| EP | 115913 | 8/1984 |
| EP | 212915 | 3/1987 |

(Continued)

OTHER PUBLICATIONS

Cranch, Geoffrey A., "Distributed Feedback Fiber Laser Strain Sensors", IEEE Sensors Journal, vol. 8, No. 7, (Jul. 2008), 12 pgs.

(Continued)

*Primary Examiner* — Jermele M Hollington
*Assistant Examiner* — Temilade S Rhodes-Vivour
(74) *Attorney, Agent, or Firm* — Thomas Rooney; Parker Justiss, P.C.

(57) ABSTRACT

A method of monitoring electromagnetic properties of a subsurface formation may include: obtaining a resistivity distribution in the subsurface formation; identifying sensor positions along a borehole; determining an effective resistivity of each region around a sensor position; deriving from the effective resistivities of regions associated with each sensor position an optimum resonance frequency; tuning an array of sensors to provide each sensor with the optimum resonance frequency; deploying the sensor array in the borehole; and collecting electromagnetic field measurements. Each sensor may include: a coil antenna positioned in a subsurface formation having a resistivity, the coil antenna generating a induced voltage signal from an electromagnetic field in the subsurface formation; and a resonant modulation circuit that converts the induced voltage signal into a telemetry signal, the resonant modulation circuit having a resonance frequency optimized for said formation resistivity.

20 Claims, 5 Drawing Sheets

(51) Int. Cl.
*E21B 47/135* (2012.01)
*G01V 3/28* (2006.01)

(56) References Cited

U.S. PATENT DOCUMENTS

| | | | |
|---|---|---|---|
| 4,939,447 A | 7/1990 | Bohnert et al. | |
| 4,950,883 A | 8/1990 | Glenn et al. | |
| 4,996,419 A | 2/1991 | Morey et al. | |
| 5,305,075 A | 4/1994 | Bucholtz et al. | |
| 5,317,576 A | 5/1994 | Leonberger et al. | |
| 5,511,083 A | 4/1996 | D'Amato | |
| 5,513,913 A | 5/1996 | Ball et al. | |
| 5,642,051 A | 6/1997 | Babour et al. | |
| 5,691,999 A | 11/1997 | Ball et al. | |
| 5,804,736 A | 9/1998 | Klauder et al. | |
| 5,844,927 A | 12/1998 | Kringlebotn | |
| 6,188,712 B1 | 2/2001 | Jiang et al. | |
| 6,271,766 B1 | 8/2001 | Didden et al. | |
| 6,325,153 B1 | 12/2001 | Harrell | |
| 6,534,986 B2 | 3/2003 | Nichols | |
| 6,597,481 B1 | 7/2003 | Fatehi et al. | |
| 6,630,658 B1 | 10/2003 | Bohnert et al. | |
| 6,731,114 B1 | 5/2004 | Lagabrielle et al. | |
| 6,961,601 B2 | 11/2005 | Matthews et al. | |
| 7,077,200 B1 | 7/2006 | Adnan et al. | |
| 7,183,777 B2 | 2/2007 | Bristow et al. | |
| 7,391,942 B2 | 6/2008 | Loock et al. | |
| 7,492,168 B2 | 2/2009 | Ogilvy et al. | |
| 7,673,682 B2 | 3/2010 | Daily | |
| 8,058,869 B2 | 11/2011 | Cranch et al. | |
| 8,165,178 B2 | 4/2012 | Henderson et al. | |
| 8,380,439 B2 | 2/2013 | Lagmanson et al. | |
| 2002/0063866 A1 | 5/2002 | Kersey et al. | |
| 2003/0038634 A1 | 2/2003 | Strack | |
| 2003/0094281 A1 | 5/2003 | Tubel | |
| 2003/0205083 A1 | 11/2003 | Tubel et al. | |
| 2004/0033017 A1 | 2/2004 | Kringlebotn et al. | |
| 2004/0056663 A1 | 3/2004 | Sinclair et al. | |
| 2004/0093950 A1 | 5/2004 | Bohnert | |
| 2004/0117119 A1 | 6/2004 | West et al. | |
| 2006/0006872 A1* | 1/2006 | Nelson | G01V 3/104 324/327 |
| 2006/0250274 A1 | 11/2006 | Mombourquette et al. | |
| 2007/0126594 A1 | 6/2007 | Atkinson et al. | |
| 2007/0131417 A1* | 6/2007 | Bolshakov | E21B 47/0005 166/250.13 |
| 2007/0228288 A1 | 10/2007 | Smith | |
| 2008/0030714 A1* | 2/2008 | Hall | G02B 27/0006 356/72 |
| 2008/0042636 A1 | 2/2008 | Koste et al. | |
| 2008/0061789 A1* | 3/2008 | Coates | E21B 47/122 324/333 |
| 2008/0253230 A1* | 10/2008 | Thompson | G01V 11/002 367/129 |
| 2008/0317400 A1 | 12/2008 | Petrov | |
| 2009/0159361 A1* | 6/2009 | Coates | G01V 11/00 181/106 |
| 2009/0188665 A1 | 7/2009 | Tubel et al. | |
| 2009/0189604 A1* | 7/2009 | Romero | G01N 24/081 324/303 |
| 2009/0192714 A1 | 7/2009 | Xue et al. | |
| 2009/0296755 A1 | 12/2009 | Brown et al. | |
| 2010/0271030 A1 | 10/2010 | Reiderman et al. | |
| 2011/0017512 A1 | 1/2011 | Codazzi | |
| 2011/0083838 A1 | 4/2011 | Labrecque | |
| 2011/0084696 A1 | 4/2011 | Tenghamn et al. | |
| 2011/0139447 A1 | 6/2011 | Ramos et al. | |
| 2011/0163891 A1 | 7/2011 | Wilson et al. | |
| 2012/0147924 A1 | 6/2012 | Hall | |
| 2012/0169334 A1* | 7/2012 | Hopper | G01N 24/081 324/303 |
| 2012/0175513 A1 | 7/2012 | Duncan et al. | |
| 2012/0223717 A1 | 9/2012 | Labrecque | |
| 2012/0293179 A1 | 11/2012 | Colombo et al. | |
| 2013/0056197 A1 | 3/2013 | Maida et al. | |
| 2013/0118734 A1 | 5/2013 | Csutak | |
| 2013/0207857 A1 | 8/2013 | Thomas | |
| 2013/0249705 A1 | 9/2013 | Sharp et al. | |
| 2013/0279841 A1 | 10/2013 | Joinson | |
| 2014/0036628 A1 | 2/2014 | Hill et al. | |
| 2014/0139225 A1 | 5/2014 | Mandviwala | |
| 2014/0191761 A1* | 7/2014 | San Martin | E21B 47/011 324/339 |
| 2014/0222343 A1 | 8/2014 | Samson et al. | |
| 2016/0334534 A1 | 11/2016 | Mandviwala et al. | |

FOREIGN PATENT DOCUMENTS

| | | |
|---|---|---|
| EP | 856753 | 5/1998 |
| GB | 2165359 | 4/1986 |
| WO | 2008/124286 | 10/2008 |
| WO | 2012/061844 | 5/2012 |
| WO | 2012/075474 | 6/2012 |
| WO | 2012/100217 | 7/2012 |
| WO | 2014/120305 | 8/2014 |
| WO | 2015/178876 | 11/2014 |
| WO | 2015/178878 | 11/2015 |

OTHER PUBLICATIONS

Bhatia, Vikram et al., "Optical Fiber Long-Period Grating Sensors", Optics Letter, vol. 21, No. 9, (May 1, 1996), 3 pgs.

Ball, G A., et al., "Single- and Multipoint Fiber-Laser Sensors", IEEE Photonics Technology Letters, vol. 5, No. 2, (Feb. 1993), 4 pgs.

Bergmann, Peter et al., "Surface-Downhole Electrical Resistivity Tomography Applied to Monitoring of CO2 Storage at Ketzin, Germany", Geophysics, vol. 77, No. 6, Nov.-Dec. 2012, pp. B253-B267.

Bristow, Q. et al., "A New Temperature, Capacitive-Resistivity, and Magnetic-Susceptibility Borehole Probe for Mineral Exploration, Groundwater, and Environmental Applications", Geological Survey of Canada, Technical Note No. 3, doi: 10.4095/289197, (2011),13 pgs.

Deceuster, John et al., "Automated Identification of Changes in Electrode Contact Properties for Long-Term Permanent ERT Monitoring Experiments", Geophysics, vol. 78, No. 2 (Mar.-Apr. 2013), (2011), pp. E79-E94.

Hibbs, A. D. et al., "Capacitive Electric Field Measurements for Geophysics", EAGE Conference and Exhibition incorporating SPE EUROPEC 2011, Vienna, Austria, Expanded Abstracts, (2011), 2 pgs.

Hibbs, Andrew et al., "New Electromagnetic Sensors for Magnetotelluric and Induced Polarization Geophysical Surveys", SEG Annual Meeting, Expanded Abstracts, (2012), 5 pgs.

Grard, R. et al., "A Mobile Four-Electrode Array and Its Application to the Electrical Survey of Planetary Grounds at Shallow Depths", Journal of Geophysical Research, vol. 96, No. B3, (Mar. 10, 1991), pp. 4117-4123.

Kiessling, Dana et al., "Geoelectrical Methods for Monitoring Geological CO2 Storage: First Results From Cross-Hole and Surface-Downhole Measurements From the CO2SINK Test Site at Ketzin (Germany)", International Journal of Greenhouse Gas Control, 4, (2010), pp. 816-826.

Kuras, Oliver et al., "Fundamentals of the Capacitive Resistivity Technique", Geophysics, vol. 71, No. 3 (May-Jun. 2006), pp. G135-G152.

Kuras, Oliver et al., "Capacitive Resistivity Imaging With Towed Arrays", Journal of Engineering and Environmental Geophysics, vol. 12, Issue 3, (2007), pp. 267-279.

Labrecque, Douglas et al., "Assessment of Measurement Errors for Galvanic-Resistivity Electrodes of Different Composition", Geophysics, vol. 73, No. 2 (Mar.-Apr. 2008), pp. F55-F64.

Macnae, James, "Electric Field Measurements in Air", SEG Annual Meeting, Expanded Abstracts, (2010), pp. 1773-1777.

Macnae, James et al., "Near-Surface Resistivity Contast Mapping With a Capacitive Sensor Array and an Inductive Source", Geophysics, vol. 76, No. 2, (Mar.-Apr. 2011), (2011), pp. G13-G23.

(56) References Cited

OTHER PUBLICATIONS

Mwenifumbo, C. J. et al., "Field Evaluation of a New Borehole Resistivity Probe Using Capacitive Electrodes", Proceedings of the Symposium on the Applications of Geophysics to Engineering and Environmental Problems, (1999), pp. 859-867.
Mwenifumbo, C. Jonathan et al., "Capacitive Conductivity Logging and Electrical Stratigraphy in a High-Resistivity Aquifer, Boise Hydrogeophysical Research Site", Geophysics, vol. 74, No. 3 (May-Jun. 2009), pp. E125-E133.
Panissod, Cedric et al., "Recent Developments in Shallow-Depth Electrical and Electrostatic Prospecting Using Mobile Arrays", Geophysics, vol. 63, No. 5 (Sep.-Oct. 1998), pp. 1542-1550.
Petiau, Gilbert, "Second Generation of Lead-Lead Chloride Electrodes for Geophysical Applications", Pure and Applied Geophysics, 157, (2000), pp. 357-382.
Shima, Hiromasa et al., "Developments of Non-Contact Data Acquisition Techniques in Electrical and Electromagnetic Explorations", Journal of Applied Geophysics, 35, (1996), pp. 167-173.
Shima, Hiromasa et al., "Fast Imaging of Shallow Resistivity Structures Using a Multichannel Capacitive Electrode System", SEG Annual Meeting, Expanded Abstracts, pp. 377-380.
Tondel, Richard et al., "Reservoir Monitoring in Oil Sands: Developing a Permanent Cross-Well System", SEG Annual Meeting, Expanded Abstracts, (2011), pp. 4077-4081.
Douma, Marten et al., "A Capacitive-Coupled Ground Resistivity System for Engineering and Environmental Applications: Results of Two Canadian Field Tests", SEG Annual Meeting, Expanded Abstracts, (1994), pp. 559-561.
Carrigan, Charles R. et al., "Electrical resistance tomographic monitoring of CO2 movement in deep geologic reservoirs", International Journal of Greenhouse Gas Control, doi: 10.1016/j.ijggc.2013.04.016, (2013), pp. 401-408.
Tabbagh, Alain et al., "Determination of Electrical Properties of the Ground at Shallow Depth With an Electrostatic Quadrupole: Field Trials on Archaeological Sites", Geophysical Prospecting, 41, (1993), pp. 579-597.
Thiel, David V. "On Measuring Electromagnetic Surface Impedance—Discussions with Professor James R. Wait", IEEE Transactions on Antennas and Propogation, vol. 48, No. 10, (2000), pp. 1517-1520.
Timofeeev, V.M. et al., "A New Ground Resistivity Method for Engineering and Environmental Geophysics", Proceedings of the Symposium on the Applications of Geophysics to Engineering and Environmental Problems, (1994), pp. 701-715.
Tondel, Richard et al., "Remote Reservoir Monitoring in Oil Sands: From Feasibility Study to Baseline Datasets", CSEG-CSPG-CWLS GeoConvention, Expanded Abstracts, (2013),5 pgs.
Zonge, Kenneth L. et al., "The Effect of Electrode Contact Resistance on Electric Field Measurements", 55th SEG Annual Meeting, Washington D.C., Expanded Abstracts, (1985),8 pgs.
PCT International Search Report and Written Opinion, dated Jan. 12, 2014, Appl No. PCT/US2013/067288, "Distributed Feedback Fiber Laser Strain Sensor Systems and Methods for Subsurface EM Field Monitoring," Filed Oct. 29, 2013, 16 pgs.
PCT International Search Report and Written Opinion, dated Nov. 5, 2014, Appl No. PCT/US2014/019228, "Optical Electric Field Sensors Having Passivated Electrodes," Filed Feb. 28, 2014, 14 pgs.
PCT International Search Report and Written Opinion, dated Feb. 4, 2015, Appl No. PCT/US2014/038542, "A Magnetic Induction Sensor with an Electro-Optical Transducer and Related Methods and Systems," Filed May 19, 2014, 17 pgs.
Coillot, Christophe et al., "Induction-Magnetometers-Principle-Modeling-and-Ways-of-Improvement", LPP Laboratory of Plasma Physics, France, (Mar. 9, 2012), pp. 45-65.
PCT International Search Report and Written Opinion, dated Feb. 17, 2015, Appl No. PCT/US2014/038552, "Optical Magnetic Field Sensor Units for a Downhole Environment," filed May 19, 2015, 15 pgs.
U.S. Non-Final Office Action, dated Jan. 19, 2016, U.S. Appl. No. 13/756,601, "Distributed Feedback Fiber Laser Strain Sensor Systems and Methods for Subsurface EM Field Monitoring," filed Feb. 1, 2013, 22 pgs.
U.S. Non-Final Office Action, dated Aug. 3, 2016, U.S. Appl. No. 13/756,601,"Distributed Feedback Fiber Laser Strain Sensor Systems and Methods for Subsurface EM Field Monitoring," filed Feb. 1, 2013, 23 pgs.
IE Office Action, dated Aug. 4, 2016, Appl No. 2016/0165, "Electromagnetic Monitoring with Formation-Matched Resonant Induction Sensors," Filed Jun. 17, 2016, 5 pgs.
U.S. Non-Final Office Action, dated Sep. 28, 2016, U.S. Appl. No. 14/712,758, "Fiberoptic Tuned-Induction Sensors for Downhole Use," filed May 14, 2015, 17 pgs.
PCT International Preliminary Report on Patentability, dated Dec. 1, 2016, Appl No. PCT/US2014/038552, "Optical Magnetic Field Sensor Units for a Downhole Environment," Filed May 19, 2014, 12 pgs.
PCT International Search Report and Written Opinion, dated Oct. 21, 2016, Appl No. PCT/US2015/041580, "Electromagnetic Monitoring with Formation-Matched Resonant Induction Sensors," Filed Jul. 22, 2015, 19 pgs.

\* cited by examiner

ELECTROMAGNETIC MONITORING WITH FORMATION-MATCHED RESONANT INDUCTION SENSORS

BACKGROUND

Oilfield operators seek to maximize hydrocarbon recovery within a given budget and timeframe. While they perform as much logging and surveying as feasible before and during the drilling and completion of production and, in some cases, injection wells, the information gathering process does not end there. The operators also wish to track the movement of fluids in and around the reservoirs, as this information enables them to adjust the distribution and rates of production among the producing and/or injection wells to avoid premature water breakthroughs and other obstacles to efficient and profitable operation. Moreover, such information gathering further enables the operators to better evaluate treatment and secondary recovery strategies for enhanced hydrocarbon recoveries.

Electromagnetic tomography offers one approach for mapping and monitoring fluid distributions between and around boreholes containing arrays of electromagnetic field transmitters and sensors. Yet the usefulness of electromagnetic tomography suffers due to a lack of sensitive, cost-effective sensing array designs suitable for deployment in hostile downhole conditions.

BRIEF DESCRIPTION OF THE DRAWINGS

Accordingly, the drawings and the following description disclose systems and methods for electromagnetic monitoring with formation-matched resonant induction sensors. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
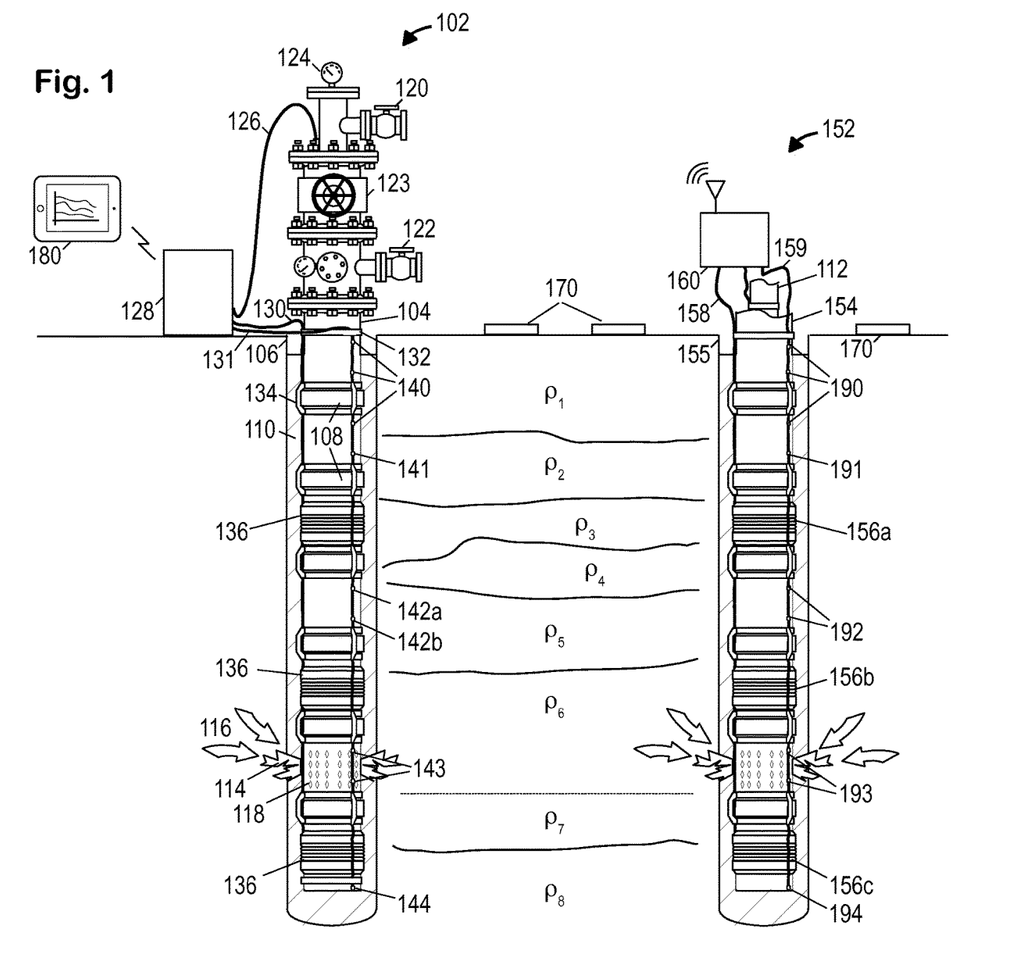
FIG. 1 depicts an illustrative electromagnetic monitoring system.

FIG. 1 shows an illustrative permanent electromagnetic ("EM") monitoring system for a reservoir, with a first well 102 having a casing string 104 set within a borehole 106. The casing string 104 includes multiple casing tubulars connected end-to-end by couplings 108. Alternative types of casing strings employ continuous steel tubing or composite tubing. Cement 110 has been injected between an outer surface of the casing string 104 and an inner surface of the borehole 106 and allowed to set. The cement 110 enhances the structural integrity of the well and seals the annulus around the casing string 104 against undesired fluid flows. Though well 102 is shown as entirely cemented, in practice certain intervals may be left without cement, e.g., in horizontal runs of the borehole where it may be desired to facilitate fluid flows.

FIG. 1 further shows perforations 114 at one or more positions along borehole 106 to facilitate the flow of a fluid 116 from a surrounding formation into the borehole and thence to the surface. The casing string 104 may include pre-formed openings 118 in the vicinity of the perforations 114, or it may be perforated at the same time as the formation. Typically the well 102 is equipped with a production tubing string positioned in an inner bore of the casing string 104. (Well 152 shows just such a production tubing string 112 in the cut-away view.) One or more openings in the production tubing string accept the borehole fluids and convey them to the earth's surface and onward to storage and/or processing facilities via a production outlet 120. The wellhead may include other ports such as port 122 for accessing the annular space(s) and a blowout preventer 123 for blocking flows under emergency conditions. Various other ports and feedthroughs are generally included to enable the use of external sensors 124 and internal sensors. Illustrative cable 126 couples such sensors to a well interface unit 128. Note that this well configuration is merely for illustrative purposes, is not to scale, and is not limiting on the scope of the disclosure.

An interface unit 128 typically supplies power to the transducers and provides data acquisition and storage, possibly with some amount of data processing. The illustrated permanent EM monitoring system includes EM transmitters and sensors coupled to the interface unit 128 via one or more armored cables 130, 131, which are attached to the exterior of casing string 104 by straps 132 and protectors 134. (Protectors 134 guide the cables 130, 131 over the couplings 108 and shield the cable from being pinched between the coupling and the borehole wall.) Cable 130 connects to one or more EM transmitters 136 attached to the casing string 104, while cable 131 connects to one or more formation-matched resonant induction sensors 140-144.

FIG. 1 further shows a second well 152 having a second casing string 154 in a borehole 155, with one or more EM transmitter modules 156 attached to the casing string and communicating via a cable 158 to a second well interface unit 160. The second well further includes a cable 159 having a downhole array of formation-matched resonant induction sensors 190-194 coupled to the second well interface unit 160. The second well interface unit 160 may be connected in a wired or wireless fashion to the first well interface unit 128 or to a central system that coordinates the operation of the wells. Additional wells and well interface units may be included in the coordinated operation of the field and the permanent EM monitoring system. (Some system embodiments employ EM sensors and transmitters in only one well, but it is generally preferred to provide additional EM sensors and transmitters on the surface and/or in other nearby wells.)

The illustrated system further includes surface transducer modules 170. The surface transducer modules 170 may employ: spaced-apart electrodes that create or detect EM signals, wire coils that create or detect EM signals, or magnetometers or other EM sensors to detect EM signals. At least one of the EM transmitters 136, 156, 170 transmits periodic or transient (i.e., pulsed) EM signals while the EM sensors obtain responsive measurements.

FIG. 1 further shows a tablet computer 180 that communicates wirelessly with the well interface unit 128 to obtain and process EM measurement data and to provide a representative display of the information to a user. The computer 180 can take different forms including a tablet, notebook, laptop, a desktop computer, a server or virtual computer on a network, a mobile phone, or some combination of like elements that couple software-configured processing capacity to a user interface. Whichever computer embodiment is employed includes software that configures the computer's processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the transducer modules and inverts the measurements to obtain one or more parameters. Those parameters may include volumetric maps of resistivity and water or hydrocarbon saturation.

The reservoir and surrounding subsurface formation include regions having differing resistivities, typically in more-or-less horizontal layers as indicated in FIG. 1. The formation resistivity is affected not only by the formation matrix material but also by the fluids found in the formation pores. Thus, as formation water replaces the hydrocarbons that are drained from the reservoir, the resistivity of the formation is altered, enabling the computer 180 to monitor the fluid front via the changes in resistivity distribution in the volumetric maps.

The computer 180 may further enable the user to adjust the configuration of the transducers, employing such parameters as firing rate of the transmitters, firing sequence of the transmitters, transmit amplitudes, transmit waveforms, transmit frequencies, receive filters, and demodulation techniques. In some contemplated system embodiments, the computer further enables the user to adjust injection and/or production rates to optimize production from the reservoir.

Figure 2A:
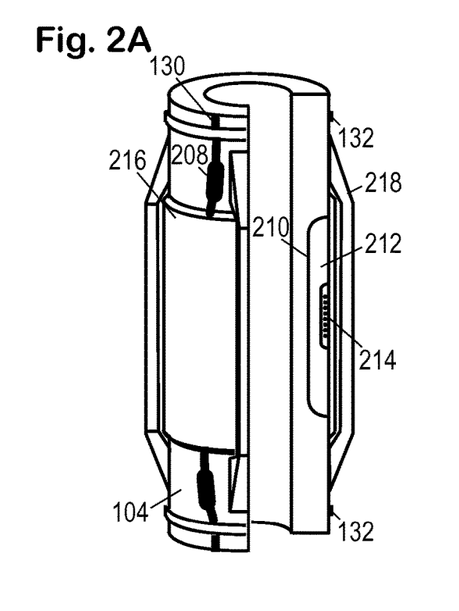
FIGS. 2A-2B depict alternative embodiments of illustrative electromagnetic transmitters.

FIG. 2A shows a partially-sectioned view of an illustrative EM transmitter module. A recess 210 has been machined into the wall of the casing 104 and filled with ferritic material 212. A coil antenna 214 overlays the ferritic material and is protected beneath a thin shell 216 of non-conductive, nonmagnetic material such as fiberglass. A set of non-magnetic centralizing arms 218 further protects the transmitter antenna. Electronics may be included in the transmitter module to derive power from the cable 130 and control the transmission process.

Figure 2B:
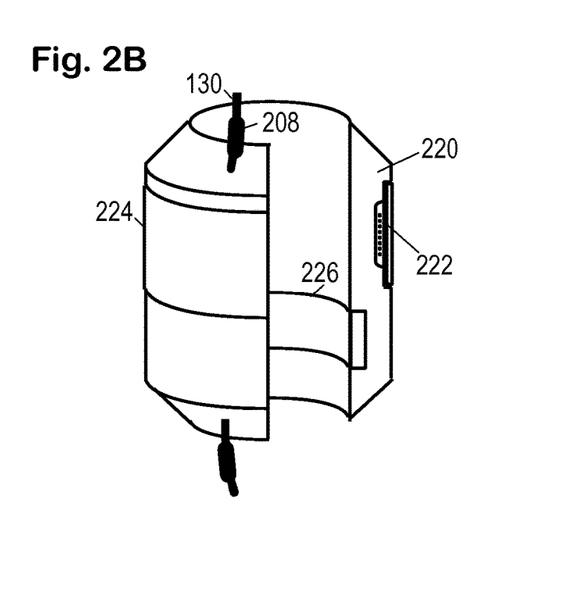

FIG. 2B is a partially-sectioned view of an alternative EM transmitter module embodiment that can be slipped over the pin end of a casing tubular just before the tubular is connected to extend the casing string. The module can be secured in place with adhesive or a clamp. The transmitter module's body 220 is primarily formed from the ferritic material, with a circumferential groove cut for the coil 222 and a protective shell 224. The body 220 further includes a recess 226 for electronics. Connectors 208 may be provided to facilitate connection of the cable 130.

Figure 3A:
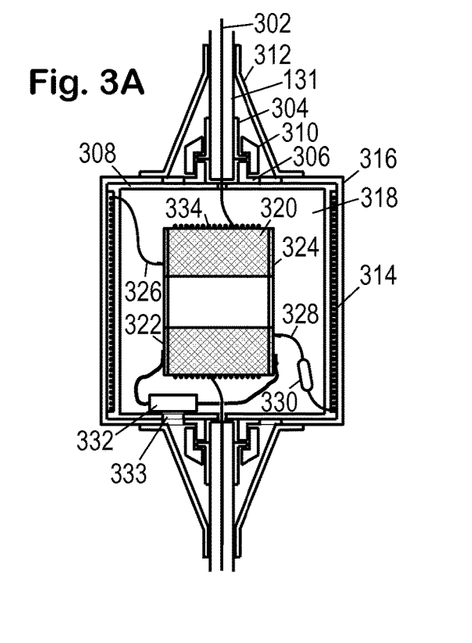
FIG. 3A is a cross-section view of an illustrative resonant induction sensor.
Figure 3B:
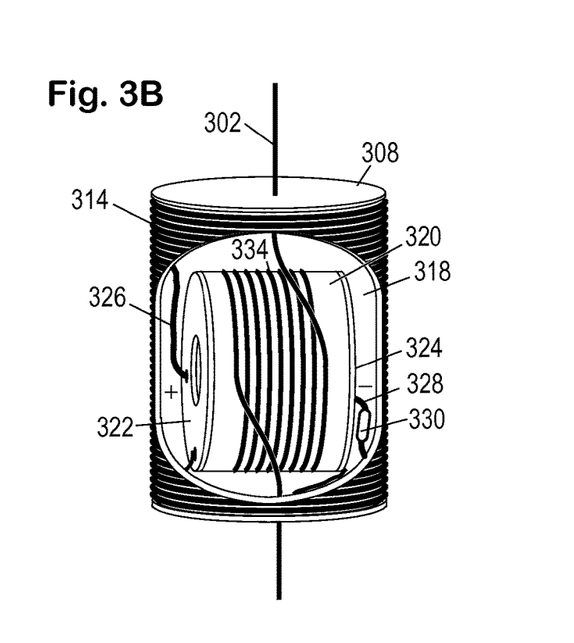
FIG. 3B is a cut-away perspective view of illustrative windings in a resonant induction sensor.

FIG. 3A shows a cross-section of an illustrative resonant induction sensor for detecting electromagnetic signals. FIG. 3B shows a cut-away perspective view of selected elements from the illustrative sensor. An optical fiber 302 from cable 131 is spliced or otherwise coupled to an optical fiber winding 334 around a cylindrical piezoelectric element 320. A flanged collar 304 secures to the cable 131 where it meets a threaded connector 306 on the sensor body 308. A threaded nut 310 secures the flanged collar 304 in a sealing fashion to the threaded connector 306. A boot 312 may also be provided with an adhesive filler material (such as a resilient sealant) to further secure the connection against fluid penetration.

In pass-through array configurations, the cable 131 continues from the opposite side of the sensor body 308, with a second flanged collar secured to a second threaded connector by a second nut sealed within a second boot. In an alternative, single-ended configuration, a reflective or absorbing termination is provided at the far end of the optical fiber winding 334. Typically, the single-ended sensors would each be coupled to the optical fiber 302 via a splitter that directs some fraction of the light into the sensor and passes the remaining light further along the cable 131 to other sensors in the array. The splitter also functions to return reflected or backscattered light from the sensor back along the cable to the interface unit.

In either case, a coil antenna 314 surrounds the sensor body 308 to convert electromagnetic fields into an induced voltage signal. (Such a coil antenna may sometimes be referred to as an induction magnetometer.) A cover 316 protects the coil antenna from mechanical damage and fluid intrusion. Both the cover 316 and the sensor body 308 preferably consist of a non-conductive non-magnetic material to avoid attenuating the response of the coil antenna 314. Alternatively a thin conductive material can be used to minimize attenuation of electromagnetic fields as they pass through the cover 316. In this case a non-magnetic conductive material is preferred since it generates the least attenuation. The sensor body's interior 318 accommodates a cylindrical piezoelectric element 320 having electrodes 322, 324 on opposing faces. Electrical leads 326, 328 respectively couple electrodes 322, 324 to the terminal points of coil antenna 314.

Electrodes 322, 324 apply the induced voltage signal across the piezoelectric element 320 in the form of an electrical field. The piezoelectric element 320 deforms in response to the electrical field, alternately expanding its diameter at the expense of its axial length and contracting its diameter in favor of lengthening along its axis. The diametrical expansion and contraction modifies the strain of the optical fiber winding 334. The changes in strain translate into slight variations of the optical fiber's index of refraction, which in turn translate into changes in the optical path length of the winding 334. These changes are detectable as variations in the travel time or phase of light signals returning from the sensor to the interface unit.

A tuning capacitance and optional damping resistance may be employed to tune the sensor, thereby placing a resonance peak of a desired bandwidth (e.g., 400 Hz) at a desired frequency (e.g., 2 kHz). The tuning capacitance may take the form of a discrete capacitor 332 wired between the electrodes 322, 324, thereby placing it in parallel with the piezoelectric element 320. The optional damping resistance may take the form of a discrete resistor 330 wired in series between one of the electrodes and the associated terminal point of the coil antenna. In an alternative embodiment, the optional damping resistance takes the form of a discrete resistor wired in parallel with the discrete capacitor, enabling a much larger resistance to provide the same amount of damping. (The parallel resistance would be

[1+Q²] times the series resistance, where Q is the quality factor.) In either case, the resonance frequency may be chosen to correspond with a carrier frequency of a transmitted EM signal. Where a broadband transmit signal is employed, the sensors may be give different resonance frequencies to enable frequency division multiplexing of their responses. The damping resistance may be chosen to reduce the sensor's sensitivity to parameter drift.

In at least some embodiments, the discrete capacitor 332 is a variable capacitor, mounted in a fashion that enables the capacitance to be adjusted after the sensor has been manufactured. In FIG. 3A, the sensor body 308 includes an opening 333 for accessing a screw or control knob in the variable capacitor 332. The opening 333 may be re-sealed after the capacitor is adjusted to the desired setting for matching the resonance frequency of the sensor to the resistivity of the formation around where the sensor will be located.

In some contemplated sensor embodiments, the piezoelectric element 320 is a Noliac NAC2125-H20, with an outer diameter of 20 mm, an inner diameter of 12 mm, and a length of 20 mm. In the contemplated embodiments, the optical fiber winding is 96 turns (about six meters) of Fibercore SM1500. To maximize the bending radius of the optical fiber, the axis of the cylindrical piezoelectric element may be turned perpendicular to the axis of the cylindrical sensor body 308. This configuration further avoids attenuation of the coil antenna response by induced currents in the electrodes 322, 324. To further enhance the response of the coil antenna 314, the remaining space in the sensor body interior 318 may be filled with a nonconductive, ferritic material or other material having a high relative magnetic permeability.

Figure 4A:
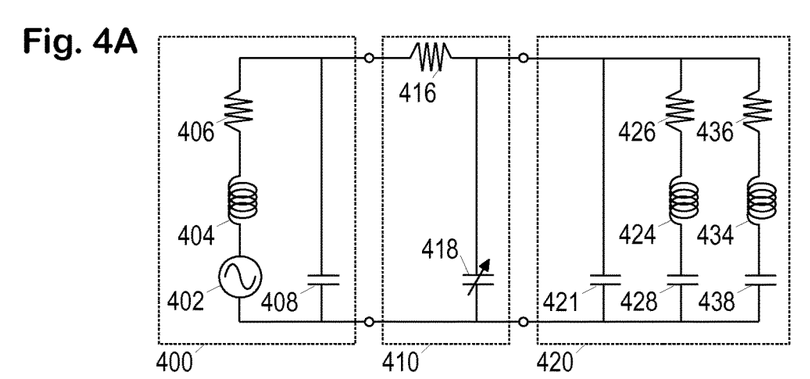
FIG. 4A is an equivalent circuit schematic of an illustrative resonant induction sensor.

FIG. 4A shows an equivalent circuit for the formation-matched resonant inductance sensor. The circuit includes three partial circuits 400, 410, 420. Partial circuit 400 is the equivalent circuit for the coil antenna 314. Partial circuit 410 is the equivalent circuit for the resonance tuning filter. Partial circuit 420 is the equivalent circuit for the piezoelectric element 320.

Partial circuit 400 includes a voltage source 402 representing the voltage signal induced by the electromagnetic fields around the coil antenna 314. A series inductor 404 represents the inductance of the antenna's coil, while series resistor 406 represents the resistance of the coil. A capacitor 408 in parallel with the series combination of source 402, inductor 404, and resistor 406, represents the parasitic capacitance of the coil.

Partial circuit 410 includes a damping resistor 416 in series between a terminal of the coil antenna and a terminal of the piezoelectric element. The other terminal of the coil antenna is connected to the other terminal of the piezoelectric element. Partial circuit 410 further includes a variable tuning capacitor 418 between the terminals of the piezoelectric element. Partial circuit 410 modifies the resonance frequency of the piezoelectric element, operating in cooperation with the piezoelectric element to convert the induced voltage signal into a filtered signal.

Partial circuit 420 includes three parallel branches between the piezoelectric element terminals. The first branch is a capacitor 421 representing the intrinsic capacitance of the piezoelectric element. For the Noliac transducer, this is about 3.77 microfarads. The second branch is a series combination of a resistor 426, inductor 424, and capacitor 428, representing the mechanical resonance in hoop mode. For the Noliac transducer, the values are about 100 milliohms, 5.49 microhenries, and 1.86 microfarads. The third branch is also a series combination of a resistor 436, inductor 434, and capacitor 438, representing the mechanical resonance in axial mode. For the Noliac transducer, the values are about 1.5 ohms, 4.6 microhenries, and 1.37 microfarads.

Figure 4B:
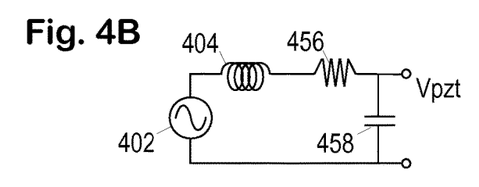
FIG. 4B is a simplified circuit schematic of an illustrative resonant induction sensor.

With the following assumptions, the equivalent circuit of FIG. 4A may be simplified as shown in FIG. 4B. (1) The inductance of the antenna coil is much larger than the inductances associated with the mechanical resonances. (2) The parasitic capacitance of the antenna coil is much smaller than the intrinsic capacitance of the piezoelectric element. (3) The resistances associated with the mechanical resonances are small enough to be ignored (or they can be lumped into the damping resistance).

The resulting simplified circuit is a single loop having the source 402, inductor 404, an equivalent resistor 456, and an equivalent capacitor 458. The equivalent resistor 456 is the sum of resistors 406 and 416. The equivalent capacitor 458 is the sum of capacitors 418, 421, 428, and 438. Representing the operation of this circuit by the ratio of the voltage across the piezoelectric element $V_{pzt}$ to the voltage induced in the coil $V_{src}$ yields:

$$\frac{V_{pst}}{V_{src}} = \frac{1}{(1 - LC(2\pi f)^2) + jRC(2\pi f)} \qquad (1)$$

where L is the inductance of inductor 404, R is the resistance of resistor 456, C is the capacitance of capacitor 458, j is sqrt(−1), and f is the signal frequency. An exact simulation of the equivalent circuit has verified the accuracy of this relationship.

To relate the voltage across the piezoelectric element to the electromagnetic field, we first note that magnetic flux density B is proportional to the magnetic field strength H:

$$B = \mu_0 H \qquad (2)$$

where $\mu_0$ is the permeability of free space ($4\pi*10^{-7}$ H/m). For an N-turn coil of cross-sectional loop area A, the voltage induced by a magnetic flux density B is:

$$V_{src} = -jNA\mu_{eff} 2\pi f \beta \cos(\theta) \qquad (3)$$

where $\mu_{eff}$ is the effective permeability of the material inside the coil and θ is the angle between the coil axis and the magnetic field direction. This in turn translates to a detector field sensitivity of:

$$\frac{V_{pzt}}{B} = \frac{-jNA\mu_{eff}(2\pi f)\cos(\theta)}{(1 - LC(2\pi f)^2) + jRC(2\pi f)}. \qquad (4)$$

Figure 5:
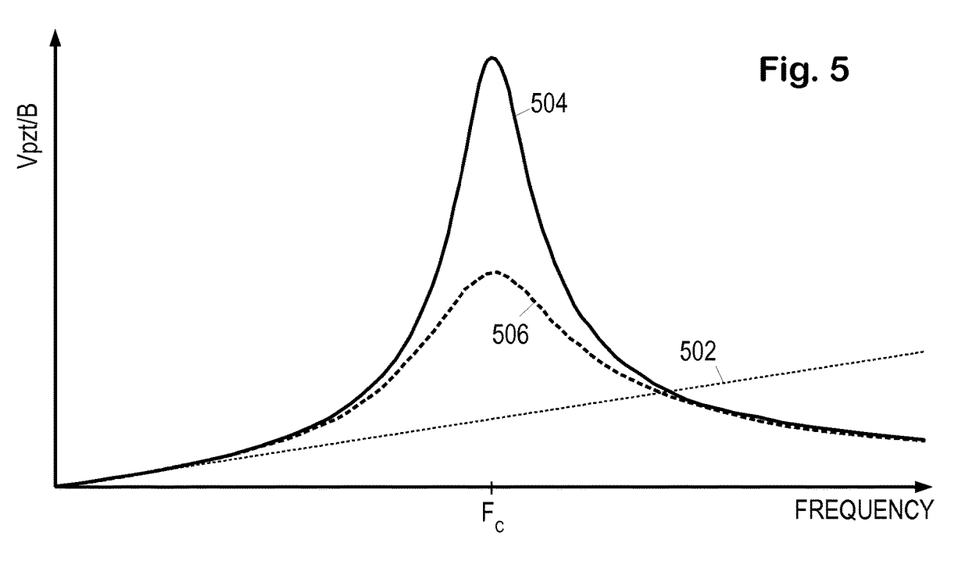
FIG. 5 is a graph of sensitivity vs. frequency for different sensor configurations.

FIG. 5 compares three sensitivity graphs. Curve 502 represents the sensitivity of an antenna coil alone (i.e., Vsrc/B). Curve 504 represents the sensitivity of the resonant inductance sensors represented by the equivalent circuits above. Note that the use of resonance significantly amplifies the sensor's response to EM fields, at least within the chosen frequency band. Curve 506 represents the sensitivity of the same sensor with an increased damping resistance. The resonance frequency (i.e., the frequency at which the peaks occur) is $$f_c = \frac{1}{2\pi\sqrt{LC}} \qquad (5)$$

while the 3 dB bandwidth of the peak is $$BW = f_c R \sqrt{\frac{C}{L}} = \frac{R}{2\pi L} \qquad (6)$$

Simulation based experiments were performed to analyze the effects caused by the drift of material and electrical parameters that would be expected for a wide variation in sensor temperature. With a nominal damping resistance of 1 ohm, the resonance frequency was observed to drop from 2 kHz to 1.8 kHz as the temperature increased from 100° C. to 150° C. while the bandwidth (400 Hz) and peak sensitivity (about 7.3) remained essentially constant.

Figure 6:
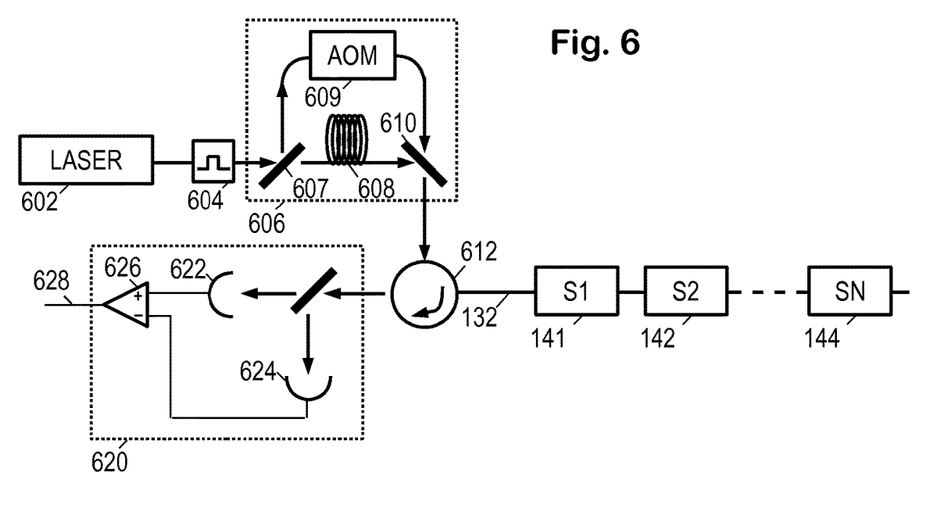
FIG. 6 shows an illustrative optical sensor interrogation system.

FIG. 6 shows one illustrative interrogation system that may operate as part of interface unit 128 for measuring the responses of the resonant inductance sensors 141-144 to electromagnetic fields, in terms of their effects on the optical fiber in cable 132. The cable 132 is coupled to a circulator 612 in the interface unit 128 (FIG. 1) to receive a sequence of interrogation light pulses and to provide a return signal. The interface unit 128 generates the interrogation light pulses using a continuous laser 602 and a gate 604 to form a sequence of pulses with a spacing that exceeds the two-way travel time between the first and last optical sensing transducers 141, 144. (Alternative pulse generator configurations may employ a semiconductor optical amplifier, or "SOA".)

A compensator 606 includes a first beam splitter 607 to direct each light pulse along two optical paths and a second beam splitter 610 to recombine the light from the two paths. As the optical paths have different propagation times, each pulse is converted into a double pulse. One of the pulses is slightly shifted in frequency due to the presence of an acousto-optic modulator 609 on one path. The other optical path provides an optical delay 608 relative to the first path to create the double-pulse. The total width of the double pulse should not exceed the minimum two-way travel time between adjacent transducers.

Light pulses propagating along the cable 132 encounter scattering imperfections in the optical fiber, causing a small fraction of the light to return from each point along the fiber to the circulator 612 with a delay that corresponds to the position of the scattering imperfections at that point. The light received at the circulator is a combination of the light scattered from the two pulses in the pulse pair, which light interferes constructively or destructively depending on its phase difference. A receiver 620 measures this interfering light, producing a signal 628 that represents the phase difference. Signal 628 may be generated using a 180° power combiner 626 that differences the signals from two photodetectors 622, 624 which are sensing the transmitted and reflected light components from a beam splitter.

Aside from a linearly-varying phase offset provided by the acousto-optic modulator 609, the phase difference associated with the segment of optical fiber between the two scattering points associated with the pulse pair is a function of the strain in that fiber segment. By dividing the measurement signal into windows for each segment and tracking the phase from each window as a function of time, the interface unit can monitor the strain as a function of time for each segment. (Coherent demodulation is used to remove the varying phase offset introduced by the acousto-optic modulator). For those segments including a transducer, the strain measurement represents the filtered sensor responses to the electromagnetic fields in the coil antennas.

We note here that the strain in other segments may also be tracked to provide distributed monitoring of other parameters affecting the strain, e.g., pressure, temperature. Additional discrete transducers may also be included for sensing other downhole parameters, e.g., acoustic signals, chemical species concentrations, fluid attenuation, etc. Although the illustrative systems show only three transducers, in principle the only limit on the number of transducers is imposed by the attenuation of light propagating along the fiber. Certain contemplated embodiments include hundreds of resonant inductance sensors on a given optical fiber.

Other suitable fiberoptic interrogation systems are known and may be used to measure the fiber strains created by each resonant induction sensor and responsively derive the EM field measurements. Such interrogation systems may employ other techniques for performing interferometric phase measurements of the piezoelectric element's effects on the optical fiber coil, including the use of in-line partial reflectors (like fiber Bragg gratings or mirrors), and further including alternative interferometric circuit configurations (like Fabry-Perot, Michelson, Mach-Zender, and Sagnac) for the sensor array. For each of these, the interface unit may coordinate the operation of the interrogation system with the operation of the EM transmitters as discussed further below.

It should also be noted that the foregoing description's focus on fiberoptic sensors is for explanatory purposes. Alternative system embodiments employ resonant induction sensors that communicate telemetry signals to the interface unit via electrical conductors in the cable 132. Such sensors may also be powered via the cable 132 to digitize measurements of the induced voltage signal as amplified by a resonant circuit, and to transmit those measurements as multiplexed digital telemetry signals.

Returning momentarily to FIG. 1, we note that the sensors are positioned in different regions of the subsurface formation and their performance is impacted by the differing resistivities of those various regions. When, for example, sensor 142a is measuring EM fields from transmitter 156a, the signal attenuation is determined by the distribution of resistivity in the region between it and the transmitter. Similarly, its measurements of fields from transmitter 156b and 156c are affected by the distribution of resistivity of the regions between it and those transmitters.

Figure 7:
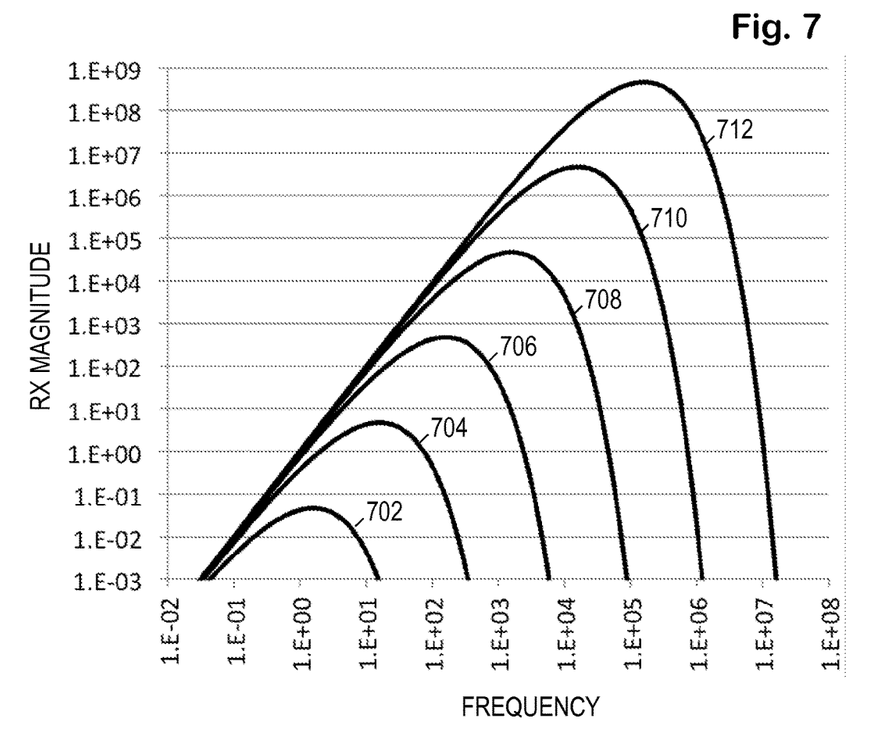
FIG. 7 is a graph of the frequency dependence of an illustrative induced signal.

With regard to the principles illustrated in FIG. 7, these attenuation effects can be modeled by embedding the sensor in an infinite homogeneous formation having an "effective resistivity" derived from the actual resistivity distribution of the region in question. For a given transmitter-receiver spacing and configuration, the received signal attenuates with an exponential decay constant that is proportional to the square root of the effective resistivity, and is inversely proportional to the frequency. Moreover, the response of an antenna coil is proportional to the square of the frequency. FIG. 7 shows the resulting frequency dependence of the receive signal amplitude for an arbitrary transmitter-receiver antenna configuration. Curves 702 through 712 represent the responses for effective resistivities of $10^{-1}$, $10^0$, $10^1$, $10^2$, $10^3$, and $10^4$ ohm-meters, respectively. Notably, the optimum signal frequencies are proportional to resistivity.

Another notable feature of FIG. 7 is that the response curves for higher resistivities always exceed those for lower resistivities. Accordingly, whenever a sensor is associated with multiple regions having significantly different effective resistivities, the optimal signal frequency for that sensor is the one that maximizes the response curve for the region having the smallest effective resistivity.

Figure 8:
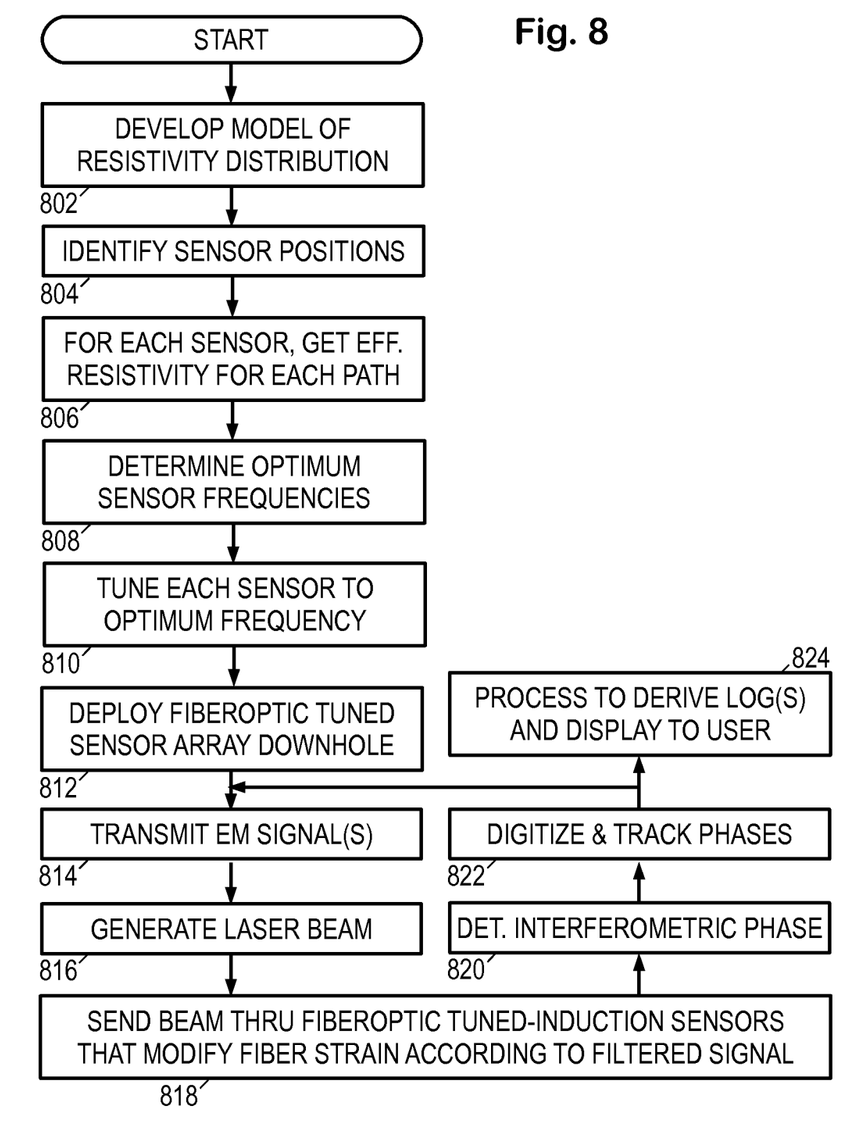
FIG. 8 is a flow chart of an illustrative electromagnetic monitoring method.

FIG. 8 is a flow diagram of an illustrative EM monitoring method using formation-matched resonant induction sensors. The method begins in block 802 with deriving a model of the resistivity distribution for the subsurface formation. Such a model may be derived from interpreted seismic surveys and well logs. In block 804, the model is augmented with positions of any existing or contemplated transmitters. These positions, along with the resistivity distribution, are generally available in a knowledge database for that region of the oilfield. The computer, perhaps with user assistance, then determines contemplated sensor positions. In at least some embodiments, the positions are evenly-spaced along the trajectory of one or more boreholes.

In block 806, the computer employs the resistivity distribution model to model the propagation of signals from each of the transmitters to each of the sensor positions, determining which sensor positions are in range of which transmitters and the effective resistivities associated with the paths from each transmitter to each sensor position. In block 808, analyzes the effective resistivities associated with each sensor position to determine the optimum signal frequency for each sensor position and reports those optimum frequencies to the user.

In block 810, the resonance frequency of each sensor is tuned to the optimum frequency for its sensor position. It is expected that this tuning will be performed manually prior to deploying the sensor array in the borehole, but in alternative system embodiments, the tuning may be performed electronically after deployment. In either case, such tuning matches the sensor to its surrounding formation.

In block 812, a crew deploys the sensing cable with an integrated array of resonant-induction sensors downhole. In at least some embodiments, the cable is strapped to a casing string as the casing string is assembled and lowered into a borehole before being cemented in place. The crew may further complete the well, performing any needed perforation, treatment, equipping, and conditioning operations to optimize production. The well may alternatively be an injection well or a "dry well" created solely for monitoring.

Alternative deployments are also contemplated, including integration into a wired drillstring for logging while drilling, and further including deployment in as part of a wireline supporting a wireline sonde. The resonant-induction sensors are interrogated via the sensing cable, which may also transport electrical power for transmitters and may further provide optical or electrical pathways for digital telemetry. Once deployment is complete, the sensing cable is attached to an interface unit for interrogation.

In block 814, the interface unit activates one or more selected EM transmitters. In some embodiments, the EM transmitters are activated in turn so that only one at a time is operating. In other embodiments, the EM transmitters are configured to modulate their signals in distinguishable fashion (e.g., using frequency or code division multiplexing), permitting multiple EM transmitters to operate at once. Some embodiments contemplate the use of a broadband signal or a swept carrier frequency for at least the initial activation of each transmitter, thereby enabling the interface unit to identify the resonance frequency of each transducer and optionally adapt subsequent EM transmissions accordingly.

In block 816 for optical fiber-based sensor arrays, the interface unit generates a laser beam that may be optionally pulsed or modulated to enable multiplexing of responses from multiple transducers in the return signal. In block 818 the one or more resonant-induction sensors modify the strain in the optical fiber, thereby modifying the travel time and phase of the passing light in accordance with a filtered signal derived from the coil antenna response to EM fields. In block 820, the interface unit measures the modified light, preferably using an interferometric phase measurement. In block 822, the interface unit digitizes the measurement signal and associates the measurements with the various sensors. The interface unit repeats blocks 814-822 to measure the response of each sensor to each transmitter, and further to track these responses as a function of time. In block 824, the computer processes the measurements to derive logs of the EM fields measured by each sensor or related measurements such as tomographic maps of formation impedance, logs of fluid front distance, etc., which are then displayed to a user to enable long term monitoring of the reservoir status.

The resonant induction sensor array has low power requirements, making it intrinsically safe, compliant with various oilfield-related electrical standards including the intelligent well interface standard (IWIS), and particularly suitable for offshore well environments having limited available power from subsea installations. In at least some embodiments, the transmitters may be located downhole and powered from batteries, downhole turbines, or other integrated power sources. The system is also suitable for use in acidic or basic high pressure and high temperature environments and can tolerate continuous vibration over an extended period.

Accordingly, among the embodiments disclosed herein are:

A: An electromagnetic monitoring system that comprises: a cable disposed along a borehole through a subsurface formation having multiple regions of differing resistivities; an array of resonant induction sensors spaced along the cable; and an interface unit that collects electromagnetic field measurements from the resonant induction sensors in the array, wherein each of the multiple regions is associated with one or more of the resonant induction sensors in the array, and wherein each resonant induction sensor has a resonance frequency that is based at least in part on the associated region's sensitivity.###

B: A method of monitoring electromagnetic properties of a subsurface formation, the method comprising: obtaining a model of resistivity distribution in the subsurface formation; identifying sensor positions along a borehole in the subsurface formation; determining an effective resistivity of each region associated with each sensor position; deriving from the effective resistivities of the regions associated with each sensor position an optimum resonance frequency for a sensor at that sensor position; tuning an array of sensors to provide each sensor with the optimum resonance frequency for that sensor's position; deploying the array of sensors in the borehole; and collecting electromagnetic field measurements from the sensors in the array.

C: A resonant induction sensor that comprises: a coil antenna positioned in a subsurface formation having a resistivity, the coil antenna generating a induced voltage signal from an electromagnetic field in the subsurface formation; and a resonant modulation circuit that converts the induced voltage signal into a telemetry signal, the resonant modulation circuit having a resonance frequency optimized for said resistivity.

Each of the embodiments A, B, and C, may have one or more of the following additional features in any combination: (1) one or more broadband electromagnetic signal transmitters, wherein the interface unit determines a response of each resonant induction sensor to each said transmitter. (2) one or more transmitters that transmit a narrowband electromagnetic signal with an adjustable carrier frequency, with a interface unit that determines a response of each resonant induction sensor having a resonance frequency approximately equal to the carrier frequency. (3) a cable that includes at least one electrical conductor, and each of the resonant induction sensors provides a sensor signal via the electrical conductor to the interface unit. (4) a cable that includes an optical fiber, and each of the resonant induction sensors modulates a stress in the fiber in accordance with a sensed electromagnetic field. (5) a interface unit that transmits light pulses along the optical fiber and derives an interferometric signal phase from backscattered light to monitor the signal from each sensor in the array. (6) a resonant modulation circuit that includes: a piezoelectric element that deforms in response to an applied voltage; and a tuning filter coupled to the coil antenna and to the piezoelectric element to produce the applied voltage from said induced voltage signal. (7) a tuning filter that includes a variable capacitor for adjusting the resonance frequency. (8) an optical fiber mechanically coupled to the piezoelectric element, wherein the piezoelectric element modifies a strain of the optical fiber in accordance with the applied voltage. (9) a telemetry signal that is transported to an interface unit as a phase modulation of an optical signal in the fiber. (10) a tuning filter that further comprises a damping resistance that provides the sensor with a desired response bandwidth. (11) functions that include: triggering one or more transmitters of electromagnetic signals, wherein said collecting includes measuring a response of each sensor in the array to each of said one or more transmitters. (12) said triggering includes adjusting the carrier frequency to approximate at least one of said optimum resonance frequencies. (13) said collecting includes using the electrical conductor to obtain electrical data signals from said sensors. (14) said collecting includes deriving the measurements from each sensor by measuring backscattered light from pulses of light. (15) the optimum resonance frequency for a sensor position is proportional to a minimum effective resistivity of the regions associated with that sensor position.

Numerous variations and modifications will become apparent to those skilled in the art once the above disclosure is fully appreciated. For example, the figures show system configurations suitable for reservoir monitoring (particularly in response to enhanced oil recovery operations or steam assisted gravity drainage), but they are also readily usable for treatment operations, cementing operations, annular fluid monitoring, and CO2 or wastewater sequestration monitoring. Though the foregoing disclosure focuses on permanent monitoring, the disclosed techniques can also be readily adapted to wireline and logging-while-drilling applications. The ensuing claims are intended to cover such variations where applicable.

What is claimed is:

1. An electromagnetic monitoring system that comprises:
   a cable disposed along a borehole through a subsurface formation having multiple regions of differing resistivities;
   an array of resonant induction sensors spaced along the cable; and
   an interface unit that collects electromagnetic field measurements from the resonant induction sensors in the array,
   wherein each of the multiple regions is associated with one or more of the resonant induction sensors in the array, and
   wherein each resonant induction sensor of the array of resonant induction sensors has a resonance frequency that is tuned to an optimum resonance frequency for that sensor's position based at least in part on the associated region's differing resistivity for the respective region of the multiple regions.

2. The system of claim 1, further comprising one or more broadband electromagnetic signal transmitters, wherein the interface unit determines a response of each resonant induction sensor to each said transmitter.

3. The system of claim 1, further comprising one or more transmitters that transmit a narrowband electromagnetic signal with an adjustable carrier frequency, wherein the interface unit determines a response of each resonant induction sensor having a resonance frequency approximately equal to the carrier frequency.

4. The system of claim 1, wherein the cable includes at least one electrical conductor, and wherein each of the resonant induction sensors provides a sensor signal via the electrical conductor to the interface unit.

5. The system of claim 1, wherein the cable includes an optical fiber, and wherein each of the resonant induction sensors modulates a stress in the fiber in accordance with a sensed electromagnetic field.

6. The system 5, wherein the interface unit transmits light pulses along the optical fiber and derives an interferometric signal phase from backscattered light to monitor the signal from each sensor in the array.

7. A method of monitoring electromagnetic properties of a subsurface formation, the method comprising:
   obtaining a model of resistivity distribution in the subsurface formation;
   identifying sensor positions along a borehole in the subsurface formation;
   determining an effective resistivity of each region of a plurality of regions associated with each sensor position;
   deriving from the effective resistivities of the regions associated with each sensor position an optimum resonance frequency for a sensor at that sensor position;
   tuning each resonant induction sensor of an array of resonant induction sensors to provide each sensor with the optimum resonance frequency for that sensor's position based on the effective resistivity for the respective region of the plurality of regions in which the resonant induction sensor is positioned;
   deploying the array of sensors in the borehole; and
   collecting electromagnetic field measurements from the sensors in the array.

8. The method of claim 7, further comprising:
   triggering one or more transmitters of electromagnetic signals,
   wherein said collecting includes measuring a response of each sensor in the array to each of said one or more transmitters.

9. The method of claim 8, wherein said one or more transmitters each generate an electromagnetic signal having sufficient bandwidth to include all of said optimum resonance frequencies.

10. The method of claim 8, wherein said one or more transmitters each generate an electromagnetic signal having an adjustable carrier frequency, and wherein said triggering includes adjusting the carrier frequency to approximate at least one of said optimum resonance frequencies.

11. The method of claim 7, wherein said array of sensors are attached to a cable having at least one electrical conductor, and wherein said collecting includes using the electrical conductor to obtain electrical data signals from said sensors.

12. The method of claim 7, wherein said array of sensors are attached to a cable having at least one optical fiber, and wherein each of said sensors modulates a stress in the at least one optical fiber in accordance with a sensed electromagnetic field.

13. The method of claim 12, wherein said collecting includes deriving the measurements from each sensor by measuring a phase of backscattered light from pulses of light.

14. The method of claim 7, wherein the optimum resonance frequency for a sensor position is proportional to a minimum effective resistivity of the regions associated with that sensor position.

15. A resonant induction sensor that comprises:
a coil antenna positioned in one of a plurality of regions in a subsurface formation, each region of the plurality of regions having a differing resistivity, the coil antenna generating a induced voltage signal from an electromagnetic field in the one of the plurality of regions in the subsurface formation; and
a resonant modulation circuit that converts the induced voltage signal into a telemetry signal, the resonant modulation circuit tuned to having a resonance frequency optimized for the differing resistivity of a respective region of the plurality of regions in which the respective resonant induction sensor is located.

16. The sensor of claim 15, wherein the resonant modulation circuit includes:
a piezoelectric element that deforms in response to an applied voltage; and
a tuning filter coupled to the coil antenna and to the piezoelectric element to produce the applied voltage from said induced voltage signal.

17. The sensor of claim 16, wherein the tuning filter includes a variable capacitor for adjusting the resonance frequency.

18. The sensor of claim 16, further comprising an optical fiber mechanically coupled to the piezoelectric element, wherein the piezoelectric element modifies a strain of the optical fiber in accordance with the applied voltage.

19. The sensor of claim 18, wherein the telemetry signal is transported to an interface unit as a phase modulation of an optical signal in the fiber.

20. The sensor of claim 16, wherein the tuning filter further comprises a damping resistance that provides the sensor with a desired response bandwidth.

* * * * *

UNITED STATES PATENT AND TRADEMARK OFFICE
CERTIFICATE OF CORRECTION

PATENT NO. : 10,711,602 B2
APPLICATION NO. : 15/500879
DATED : July 14, 2020
INVENTOR(S) : Donderici et al.

It is certified that error appears in the above-identified patent and that said Letters Patent is hereby corrected as shown below:

In the Claims

Delete Claim 1, in Column 11, Lines 56-67 and Column 12, Lines 1-6 and insert:
--1. An electromagnetic monitoring system that comprises:
 a cable disposed along a borehole through a subsurface formation having multiple regions of differing resistivities;
 an array of resonant induction sensors spaced along the cable for detecting a plurality of transmitted electromagnetic signals; and
 an interface unit that collects electromagnetic field measurements from the plurality of transmitted electromagnetic signals detected by the resonant induction sensors in the array, wherein:
  each of the multiple regions is associated with one or more of the resonant induction sensors in the array, and
  each resonant induction sensor of the array of resonant induction sensors has a resonance frequency that is tuned to an optimum resonance frequency which matches a specific resistivity of a region of the multiple regions in which that resonant induction sensor is positioned, where the optimum resonance frequency corresponds to a carrier frequency of a transmitted electromagnetic signal of the plurality of transmitted electromagnetic signals most proportional to the specific resistivity.--

Delete Claim 7, in Column 12, Lines 30-50 and insert:
--7. A method of monitoring electromagnetic properties of a subsurface formation, the method comprising:
 obtaining a model of resistivity distribution in the subsurface formation;
 identifying positions of each resonant induction sensor of an array of resonant induction sensors along a borehole in the subsurface formation;
 determining an effective resistivity of each region of a plurality of regions associated with each position of each resonant induction sensor of the array of resonant induction sensors;
 deriving from the effective resistivities of the regions associated with each position of each resonant induction sensor of the array of resonant induction sensors an optimum resonance frequency for each corresponding resonant induction sensor of the array of resonant induction sensors;

Signed and Sealed this
Tenth Day of November, 2020

Andrei Iancu
*Director of the United States Patent and Trademark Office* tuning each resonant induction sensor of the array of resonant induction sensors to provide each resonant induction sensor with the optimum resonance frequency which matches a specific effective resistivity of a region of the plurality of regions in which that resonant induction sensor is positioned, where the optimum resonance frequency corresponds to a carrier frequency of a transmitted electromagnetic signal of a plurality of transmitted electromagnetic signal most proportional to the specific effective resistivity;

deploying the array of resonant induction sensors in the borehole; and collecting electromagnetic field measurements from the plurality of transmitted electromagnetic signals detected by the resonant induction sensors in the array.--

Delete Claim 8, in Column 12, Lines 51-56 and insert:
--8. The method of claim 7, further comprising:
    triggering one or more transmitters of electromagnetic signals,
    wherein the collecting includes measuring a response of each resonant induction sensor in the array of resonant induction sensors to each of the one or more transmitters.--

Delete Claim 9, in Column 12, Lines 57-60 and insert:
--9. The method of claim 8, wherein the one or more transmitters each generate an electromagnetic signal having sufficient bandwidth to include all of the optimum resonance frequencies.--

Delete Claim 10, in Column 12, Lines 61-65 and insert:
--10. The method of claim 8, wherein the one or more transmitters each generate an electromagnetic signal having an adjustable carrier frequency, and wherein the triggering includes adjusting the carrier frequency to approximate at least one of the optimum resonance frequencies.--

Delete Claim 11, in Column 12, Lines 66-67 and Column 13, Lines 1-3 and insert:
--11. The method of claim 7, wherein the array of resonant induction sensors are attached to a cable having at least one electrical conductor, and wherein the collecting includes using the electrical conductor to obtain electrical data signals from the resonant induction sensors.--

Delete Claim 12, in Column 13, Lines 4-8 and insert:
--12. The method of claim 7, wherein the array of resonant induction sensors are attached to a cable having at least one optical fiber, and wherein each of the resonant induction sensors modulates a stress in the at least one optical fiber in accordance with a sensed electromagnetic field.--

Delete Claim 13, in Column 13, Lines 9-12 and insert:
--13. The method of claim 12, wherein the collecting includes deriving the measurements from each resonant induction sensor by measuring a phase of backscattered light from pulses of light.--

Delete Claim 14, in Column 13, Lines 13-16 and insert:
--14. The method of claim 7, wherein the optimum resonance frequency for a position of each resonant induction sensor of the array of resonant induction sensors is proportional to a minimum effective resistivity of the regions associated with that position of each resonant induction sensor.--

Delete Claim 15, in Column 13, Lines 17-25 and Column 14, Lines 1-4 and insert:
--15. A resonant induction sensor that comprises:

a coil antenna positioned in one of a plurality of regions in a subsurface formation, each region of the plurality of regions having a differing resistivity, the coil antenna generating a induced voltage signal from an electromagnetic field generated by an electromagnetic signal in the one of the plurality of regions in the subsurface formation; and a resonant modulation circuit that converts the induced voltage signal into a telemetry signal, the resonant modulation circuit tuned to having a resonance frequency which matches a resistivity of the differing resistivities for the one of the plurality of regions in which the resonant induction sensor is positioned, where the optimum resonance frequency corresponds to a carrier frequency of the transmitted electromagnetic signal in the one of the plurality of regions most proportional to the resistivity of the one of the plurality of regions.--

Delete Claim 16, in Column 14, Lines 5-11 and insert:
--16. The resonant induction sensor of claim 15, wherein the resonant modulation circuit includes:
a piezoelectric element that deforms in response to an applied voltage; and
a tuning filter coupled to the coil antenna and to the piezoelectric element to produce the applied voltage from the induced voltage signal.--

Delete Claim 17, in Column 14, Lines 12-14 and insert:
--17. The resonant induction sensor of claim 16, wherein the tuning filter includes a variable capacitor for adjusting the resonance frequency.--

Delete Claim 18, in Column 14, Lines 15-18 and insert:
--18. The resonant induction sensor of claim 16, further comprising an optical fiber mechanically coupled to the piezoelectric element, wherein the piezoelectric element modifies a strain of the optical fiber in accordance with the applied voltage.--

Delete Claim 19, in Column 14, Lines 19-21 and insert:
--19. The resonant induction sensor of claim 18, wherein the telemetry signal is transported to an interface unit as a phase modulation of an optical signal in the fiber.--

Delete Claim 20, Column 14, Lines 22-24 and insert:
--20. The resonant induction sensor of claim 16, wherein the tuning filter further comprises a damping resistance that provides the resonant induction sensor with a desired response bandwidth.--